US008085051B2

(12) United States Patent
Iida

(10) Patent No.: US 8,085,051 B2
(45) Date of Patent: Dec. 27, 2011

(54) ABNORMALITY DETECTING DEVICE FOR STORAGE ELEMENT, ABNORMALITY DETECTING METHOD FOR STORAGE ELEMENT, ABNORMALITY DETECTING PROGRAM FOR STORAGE ELEMENT, AND COMPUTER-READABLE RECORDING MEDIUM STORING ABNORMALITY DETECTING PROGRAM

(75) Inventor: Takuma Iida, Osaka (JP)

(73) Assignee: Panasonic Corporation, Osaka (JP)

( * ) Notice: Subject to any disclaimer, the term of this patent is extended or adjusted under 35 U.S.C. 154(b) by 452 days.

(21) Appl. No.: 12/513,321

(22) PCT Filed: Nov. 1, 2007

(86) PCT No.: PCT/JP2007/071338
§ 371 (c)(1),
(2), (4) Date: May 1, 2009

(87) PCT Pub. No.: WO2008/053969
PCT Pub. Date: May 8, 2008

(65) Prior Publication Data
US 2010/0066379 A1 Mar. 18, 2010

(30) Foreign Application Priority Data

Nov. 2, 2006 (JP) ................................. 2006-299364

(51) Int. Cl.
*G01N 27/416* (2006.01)
(52) U.S. Cl. ...................................................... 324/433
(58) Field of Classification Search .................. 324/426, 324/427, 433, 434; 320/118, 119, 132, 149, 320/DIG. 21
See application file for complete search history.

(56) References Cited

U.S. PATENT DOCUMENTS

| 5,656,915 A | * | 8/1997 | Eaves | 320/118 |
| 6,624,612 B1 | | 9/2003 | Lundquist | |
| 6,642,692 B2 | * | 11/2003 | Kinoshita | 320/112 |

(Continued)

FOREIGN PATENT DOCUMENTS

| DE | 195 41 959 A1 | 5/1996 |
| EP | 1 670 113 A2 | 6/2006 |
| EP | 2 043 222 A2 | 4/2009 |

(Continued)

OTHER PUBLICATIONS

European Search Report issued in European Patent Application No. 07831072.9-1227/2083494 PCT/JP2007071338, dated Jan. 12, 2010.

*Primary Examiner* — Edward Tso
(74) *Attorney, Agent, or Firm* — McDermott Will & Emery LLP

(57) ABSTRACT

An abnormality detecting device for a storage element is able to improve accuracy of abnormality detection for the storage element. The device includes at least an equalization process portion, an abnormality determination portion, a voltage measurement portion, and a control portion. The control portion issues a command to the equalization process portion to start an equalization process in a case where there is a variance in capacity of storage element blocks B1, B2, . . . and BN. The abnormality determination portion performs an abnormality determination on the storage element blocks B1, B2, . . . , and BN using voltages across the terminals of the respective storage element blocks B1, B2, . . . , and BN that have been allowed to stand after an elapse of a predetermined time since the end of the equalization process.

10 Claims, 8 Drawing Sheets

| U.S. PATENT DOCUMENTS | | | |
|---|---|---|---|
| 7,176,654 B2 * | 2/2007 | Meyer et al. | 320/110 |
| 2001/0054877 A1 * | 12/2001 | Kinoshita | 320/112 |
| 2002/0017895 A1 | 2/2002 | Kawashima | |
| 2003/0052646 A1 | 3/2003 | Minamiura et al. | |
| 2006/0028179 A1 | 2/2006 | Yudahira et al. | |
| 2007/0029971 A1 | 2/2007 | Anderson et al. | |

| FOREIGN PATENT DOCUMENTS | | |
|---|---|---|
| JP | 11-178225 | 7/1999 |
| JP | 2003-204627 | 7/2003 |
| JP | 2003-282155 | 10/2003 |
| JP | 2003-282156 | 10/2003 |
| JP | 2006-058285 | 3/2006 |

* cited by examiner

ABNORMALITY DETECTING DEVICE FOR STORAGE ELEMENT, ABNORMALITY DETECTING METHOD FOR STORAGE ELEMENT, ABNORMALITY DETECTING PROGRAM FOR STORAGE ELEMENT, AND COMPUTER-READABLE RECORDING MEDIUM STORING ABNORMALITY DETECTING PROGRAM

RELATED APPLICATIONS

This application is the U.S. National Phase under 35 U.S.C. §371 of International Application No. PCT/JP2007/071338, filed on Nov. 1, 2007, which in turn claims the benefit of Japanese Application No. 2006-299364, filed on Nov. 2, 2006, the disclosures of which Applications are incorporated by reference herein.

TECHNICAL FIELD

The present invention relates to an abnormality detecting device for a storage element capable of improving accuracy of abnormality detection on a storage element incorporated into a power supply system, an abnormality detecting method for a storage element, an abnormality detecting program for a storage element, and a computer-readable recording medium for storing an abnormality detecting program.

BACKGROUND ART

Recently, a storage device is combined with a power generator, for example, a solar cell, so as to be used as a power supply system. The power generator generates electric power using natural energy, such as sunlight, wind power, and hydraulic power. Such a power supply system formed by combining the storage device improves energy efficiencies by storing surplus electric power in the storage device and feeding electric power from the storage device when electric power is necessary in a load device.

One example of such a power supply system can be a photovoltaic system. In the photovoltaic system, the storage device is charged with surplus electric power when an amount of electric power generation by sunlight is more than an amount of electric power consumed by the load device. Conversely, when an amount of electric power generation is less than an amount of electric power consumed by the load device, electric power discharged from the storage device is fed to the load device in order to compensate for a shortfall of electric power.

In this manner, owing to the ability to store surplus electric power that has not been conventionally utilized in the storage device, the photovoltaic system is able to enhance energy efficiencies in comparison with a conventional power supply system.

Also, the charge and discharge control of the storage device is performed in such a manner that a remaining capacity (hereinafter, referred to as the SOC) indicating a state of charge of the storage device will not be increased to 100% in order to charge the storage device in the photovoltaic system efficiently with surplus electric power and the SOC will not drop to 0 (zero) in order to feed electric power to the load device whenever necessary. More specifically, the storage device is normally controlled in such a manner that the SOC varies in a range of 20 to 80%.

Such a principle is used also in a hybrid electric vehicle (hereinafter, abbreviated as HEV) using both the engine and the motor. In a case where an output from the engine is larger than motive power needed for driving, the HEV drives the electric generator with surplus electric power to charge the storage device. Meanwhile, the HEV charges the storage device by using the motor as the electric generator during braking or deceleration of the vehicle.

Recently, attention has been paid to a load leveling power supply and a plug-in HEV that effectively utilize nighttime electric power. The load leveling power supply is a system that consumes less electric power. It is a system that stores electric power in the storage device during nighttime hours when electricity charges are cheap and uses the stored electric power during daytime hours when electric power consumption reaches the peak. The purpose of this system is to maintain an amount of electric power generation constant by leveling an amount of electric power consumption, so that a contribution can be made to efficient operation of power equipment and a reduction of capital investment.

On the contrary, the plug-in HEV uses nighttime electric power. When the HEV runs in an urban area where fuel efficiency is poor, it is mainly driven by EV driving in which electric power is fed from the storage device whereas it is driven by HEV driving by which the engine and the motor are used when it runs over a long distance. The purpose of the plug-in HEV is to reduce a total amount of $CO_2$ emission.

Incidentally, the storage device incorporated in the power supply system described above or the like is formed by connecting a plurality of storage elements (electric cells, unit batteries, etc.) in series. In the storage device formed in this manner, a capacity can vary from one storage element to another. In this case, when the storage device is discharged deeply at a large current, a storage element having a small capacity is over-discharged in comparison with other storage elements. Consequently, the overdischarged storage element deteriorates, which shortens the life of the storage device as a whole.

In order to suppress such deterioration of the life of the storage device, when a variance in capacity occur among the storage elements, the storage device is normally controlled so as to eliminate a variance in capacity using equalization means. However, when the storage device deteriorates, the capacity is reduced, which causes the internal resistance to rise. Accordingly, even when the capacities are made equal using the equalization means, a voltage drop becomes larger by the rising internal resistance when a large current is flowed, and the voltage readily reaches the lower limit. Deterioration of the storage device is thus accelerated and the safety of the battery is degraded.

It is therefore crucial to detect deterioration of the storage device and the following methods are proposed as the detection method.

For example, Patent Document 1 discloses, as means for detecting deterioration of a battery, a method of discharging the battery by a predetermined amount after an equalization discharge process and determining deterioration of the battery on the basis of a voltage when the discharge ends.

Also, Patent Document 2 discloses, as a method of determining deterioration, a method of detecting voltages across blocks for a plurality of blocks (or cells) forming the storage device and determining an abnormality depending on whether a detected voltage difference exceeds a predetermined value.

Further, Patent Document 3 describes a determination method as follows. When the storage device deteriorates, an amount of discharge resulting from self-discharge increases while not in use (unused period), and so does an amount of voltage drop when the storage device is left unused over a long period. Accordingly, a voltage drop from immediately after the storage device is ended until it is started next (unused period) is calculated for each of the blocks forming the storage device and deterioration of a secondary battery is determined depending on whether a difference between the calculated voltage drop and the reference value exceeds a predetermined value.

The determination methods described as above, however, have the following inconveniences.

According to the method disclosed in Patent Document 1, because a predetermined amount of electric power is further discharged after the equalization discharge process, the state of charge of the storage device is deteriorated further. This raises a problem that an amount of energy (service life) that can be fed to the load device is reduced, which degrades the convenience of the device.

According to the method disclosed in Patent Document 2, a voltage difference at the time of detection is used for a determination. However, in a case where a variance in capacity occurs due to a decrease of the charge efficiency, a voltage difference caused by a variance in capacity is determined erroneously as being a voltage difference caused by deterioration. Accuracy of detection is therefore lowered.

According to the method disclosed in Patent Document 3, a determination is performed on the basis of an amount of voltage drop from the start to the end of the unused period. However, because a state (state of charge) at the start of the unused period varies from one block to another, a calculated amount of voltage drop is influenced considerably by the state of charge at the start. This makes it difficult to improve accuracy of abnormality detection.

Patent Document 1: JP-A-2003-282156
Patent Document 2: JP-A-11-178225
Patent Document 3: JP-A-2003-204627

DISCLOSURE OF THE INVENTION

An object of the invention is to provide an abnormality detecting device for a storage element that improves accuracy of abnormality detection on the storage element by performing an abnormality determination on the storage element without influences of a variance in capacity and the state of charge of the storage element.

An abnormality detecting device for a storage element according to one aspect of the invention includes: an equalization process portion that eliminates a variance of states of charge of a plurality of storage portions including at least one storage element so as to make the states of charge of the plurality of storage portions equal; an abnormality determination portion that determines an abnormality in the respective storage portions; a voltage measurement portion that measures voltages across terminals of the respective storage portions; and a control portion that obtains the voltages across the terminals of the respective storage portions from the voltage measurement portion and controls an equalization process by the equalization process portion and an abnormality determination process by the abnormality determination process portion on the basis of the voltages across the terminals of the respective storage portions. The control portion has a calculation portion that calculates an abnormality determination value used in the abnormality determination process on the basis of an amount of change of the voltages across the terminals of the respective storage portions that have been allowed to stand since an end of the equalization process on the respective storage portions. The abnormality determination process portion has a determination portion that performs an abnormality determination from the abnormality determination value.

In the abnormality detecting device for a storage element described above, an abnormality determination is performed on the respective storage portions using an amount of change of the voltages across the terminals of the respective storage portions caused by allowing the respective storage portions to stand after the states of charge of the respective storage portions are made equal. It thus becomes possible to perform a determination on the basis of an amount of change of the voltages across the terminals when the storage devices are allowed to stand after a variance in capacity and a variance of states of charge, such as a variance in voltage, of the respective storage devices are eliminated. Hence, because there will be no influences of a variance of the states of charge, accuracy of the abnormality determination on the respective storage portions can be improved. In addition, by determining an abnormality in the respective storage portions at high accuracy, it becomes possible to detect deterioration of these storage portions precisely, which can in turn makes it possible to upgrade the safety of the storage portions.

BEST MODE FOR CARRYING OUT THE INVENTION

Figure 1:
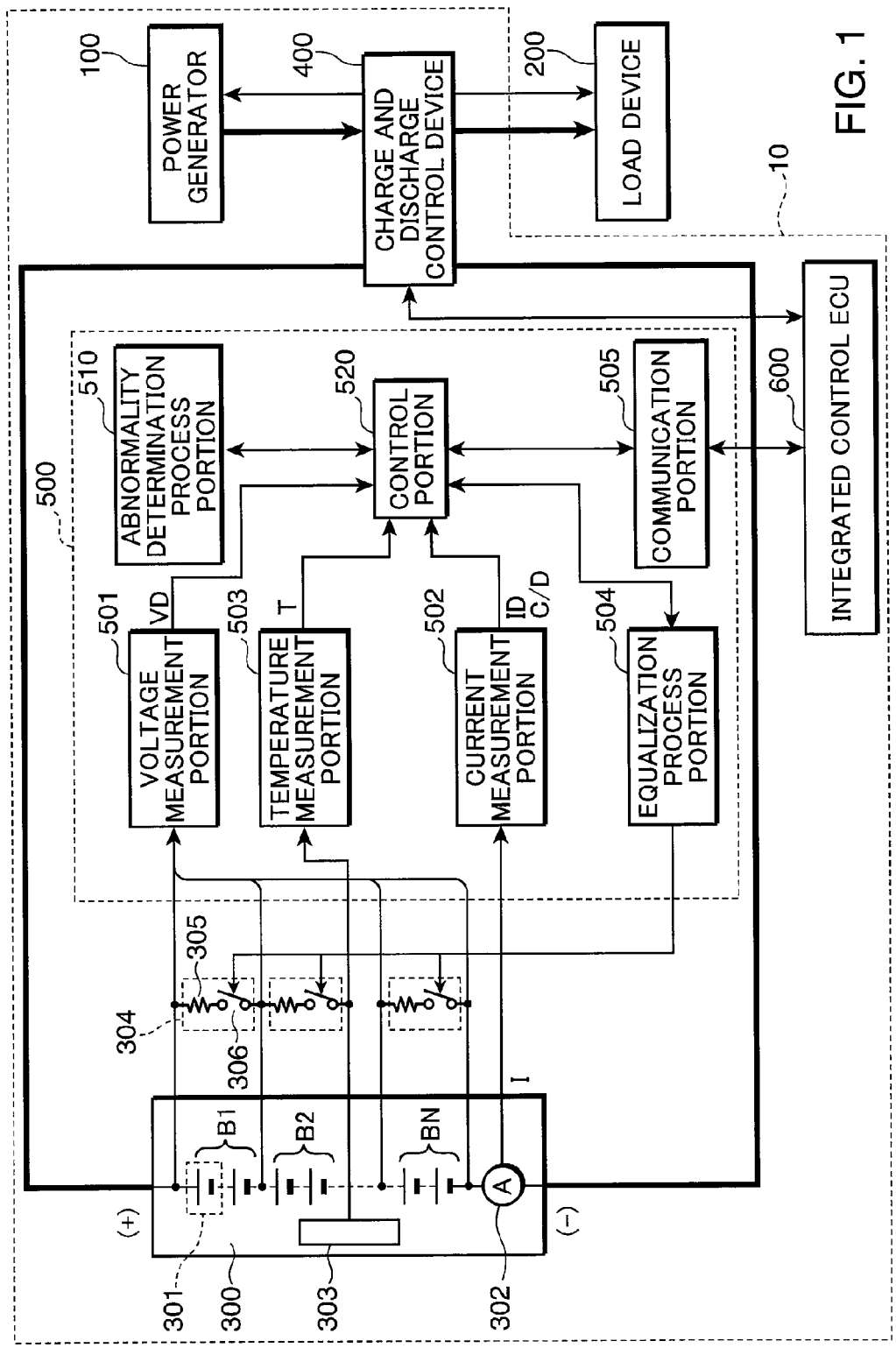
FIG. 1 is a view showing the configurations of an abnormality detecting device according to a first embodiment of the invention and a power supply system incorporating the abnormality detecting device.

Hereinafter, embodiments of the invention will be described with reference to the drawings. Same components or similar components are labeled with same or similar reference numerals in these drawings and descriptions of such components are omitted in the following where appropriate.

First Embodiment

FIG. 1 is a view showing the configuration of a power supply system equipped with an abnormality detecting device according to a first embodiment of the invention. Referring to FIG. 1, a power supply system 10 according to the first embodiment of the invention includes a power generator 100 that generates electric power from natural energy, such as sunlight, wind power, and hydraulic power, a storage device 300 that stores surplus electric power from the power generator 100 and feeds the stored electric power as needed to a load device 200 driven by a supply of electric power, a charge and discharge control device 400 that controls charge and discharge of the storage device 300, an abnormality detecting device 500 that performs an abnormality detection process on the storage device 300, and an integrated control ECU (Electric Control Unit) 600 that is connected to both the abnormality detecting device 500 and the charge and discharge control device 400 and controls the overall power supply system 10.

The power generator 100 is a power generator that utilizes natural energy, for example, a photovoltaic unit (solar cell), a wind power generation unit, and a hydraulic power generation unit. It also includes an electric generator using an engine as a power source.

The load device 200 includes various loads driven by a supply of electric power. Besides known devices, a hydrogen station that utilizes power generation by natural energy and an electric generator (for example, a fuel cell) is also available.

The storage device 300 is formed by connecting N storage element blocks B1, B2, ..., and BN in series. Also, each of the storage element blocks B1, B2, ..., and BN is formed by electrically connecting a plurality of storage elements 301 in series. As each storage element 301, an alkaline storage battery, such as a nickel hydride battery, an organic battery, such as a lithium-ion battery, and an electric double layer capacitor can be used. The number of storage element blocks, N, and the number of storage elements 301 are not particularly limited. The storage device 300 is not limited to the configuration of FIG. 1, either.

The charge and discharge control device 400 is connected to the power generator 100, the load device 200, and the storage device 300 respectively, and controls charge from the power generator 100 to the storage device 300 and discharge from the storage device 300 to the load device 200. The charge and discharge control device 400 controls the storage device 300 to be charged with a surplus of electric power outputted from the power generator 100 for the load device 200.

On the contrary, in a case where electric power required by the load device 200 exceeds an amount of electric power generation by the power generator 100 due to an abrupt increase of a current consumed by the load device 200 or a decrease of an amount of electric power generation by the power generator 100, the charge and discharge control device 400 controls the storage device 300 to discharge electric power comparable to a shortage to the load device 200.

The charge and discharge control on the storage device 300 by the charge and discharge control device 400 is normally performed in such a manner that the SOC of the storage device 300 falls within a range of 20 to 80%. It should be noted, however, that the load leveling power supply, the plug-in HEV, and the like that effectively utilize nighttime electric power are controlled in such a manner that the storage device 300 is charged to a state where the SOC is 100% and discharged when the load device requires energy.

The abnormality detecting device 500 according to the first embodiment of the invention will now be described using FIG. 1.

Referring to FIG. 1, the abnormality detecting device 500 includes a voltage measurement portion 501 that measures a voltage value of the storage device 300, a current measurement portion 502 that measures a current value of the storage device 300, a temperature measurement portion 503 that measures a temperature of the storage device 300, an equalization process portion 504 that performs an equalization process on the storage element blocks B1, B2, ..., and BN forming the storage device 300, an abnormality determination process portion 510 that performs an abnormality determination process on the storage element blocks B1, B2, ..., and BN forming the storage device 300, a communication portion 505 that makes communications with the ECU 600, and a control portion 520 that controls the respective portions within the abnormality detecting device 500.

The voltage measurement portion 501 measures voltages V0, V1, V2, ..., VN-1, and VN across the terminals of the respective N storage element blocks B1, B2, ..., and BN forming the storage device 300 in predetermined cycles in time series. It converts the measured voltage across the terminals of each storage element block that is now in the form of an analog signal to a digital signal, and outputs data of the voltage across the terminals of each block and the additional value thereof as voltage data VD of the storage device 300. The voltage data VD is outputted from the voltage measurement portion 501 to the control portion 520 in predetermined cycles. For example, a flying capacitor method is known as a method of measuring a voltage across the terminals of each storage element block in time series.

The current measurement portion 502 measures a charge and discharge current I of the storage device 300 using a current sensor 302 in predetermined cycles. It converts the measured charge and discharge current that is now in the form of an analog signal to a digital signal and outputs the digital signal as current data ID together with a sign, C(charge)/D (discharge), indicating a charge direction (+)/discharge direction (−), respectively. As with the data outputted from the voltage measurement portion 501, the data is also outputted from the current measurement portion 502 to the control portion 520 in predetermined cycles. Herein, the current sensor 302 is made up of a resistance element, a current transformer, or the like.

The temperature measurement portion 503 measures an internal temperature of the storage device 300 in predetermined cycles using a temperature sensor 303 disposed inside the storage device 300. It converts the measured temperature that is now in the form of an analog signal to a digital signal and outputs the digital signal as temperature data T to the control portion 520 in predetermined cycles.

The control portion 520 adds up the current data ID outputted from the current measurement portion 502 in a predetermined period (for example, a period no longer than a day) to calculate an integral capacity Q. During this add up operation, in a case where the sign, C/D, received with the current data ID indicates the charge direction (+), the current data ID is multiplied by a charge efficiency (a coefficient smaller than 1, for example, 0.8). The control portion 520 predicts a remaining capacity, SOC, using the integral capacity Q and stores the predicted SOC.

Herein, the SOC is found using the integral capacity Q as described above. This embodiment, however, is not limited to this configuration. For example, a plurality of pairs of data, each pair being made up of the voltage data VD and the current data ID, may be acquired in terms of the charge direction (+) and the discharge direction (−) to find a no-load voltage Vo, which is a voltage intercept when these pairs of data are approximated to a straight line (VD-ID straight line). Then, the SOC can be found by referring to an electromotive force versus SOC characteristic table, which is empirically found in advance, using, as an index, an electromotive force Vemf obtained by subtracting a voltage drop caused by an internal resistance and polarization components of the storage device 300 from the no-load voltage Vo.

Further, in an application where the temperature of the storage device 300 varies considerably, the temperature data T outputted from the temperature measurement portion 503 can be used as a correction parameter for the electromotive force versus SOC characteristic table.

In a case where the voltages V0, V1, V2, ..., VN-1, and VN across the terminals of the storage element blocks B1, B2, ..., BN forming the storage device 300 vary considerably, the equalization process portion 504 performs an equalization process on the storage element blocks B1, B2, ..., BN forming the storage device 300 according to a command from the control portion 520.

Herein, the equalization process by the equalization process portion 504 will be described. As is shown in FIG. 1, a discharge circuit 304 is connected to the both terminals of each of the storage element blocks B1, B2, ..., and BN forming the storage device 300. Each discharge circuit 304 is made up of a resistor 305 and a switch 306, and each switch 306 is controlled to open and close by the equalization process portion 504.

The control portion 520 finds the maximum voltage value and the minimum voltage value among the voltages across the terminals of the respective storage element blocks B1, B2, ..., and BN and calculates a voltage difference. In a case where a predetermined amount of the voltage difference is occurring, it sets the minimum voltage value as a target voltage value. The equalization process portion 504 calculates discharge times corresponding to differences between the reference voltage value and the voltages across the terminals of the respective storage element blocks B1, B2, ..., and BN for each of the storage element blocks B1, B2, ..., and BN. It then turns the respective discharge circuits 304 to an ON state by closing the switches 306 of the discharge circuits 304 of the respective storage elements B1, B2, ..., and BN for the discharge times that have been found. This allows a storage element block having a voltage across the terminals larger than the target voltage value to perform constant-resistance discharge using the resistor 305. The equalization process portion 504 controls the discharge of the respective blocks while monitoring the voltages across the terminals of the respective storage element blocks, and to this end, it has an internal timer capable of measuring the monitoring time.

The equalization process described above uses constant-resistance discharge. It may, however, be a process using variable resistance. It goes without saying that the equalization may be performed conversely by charging the respective storage element blocks to a predetermined voltage.

As is shown in FIG. 2A, the abnormality determination process portion 510 includes a comparison portion 511 that compares the voltages across the terminals of the respective storage element blocks B1, B2, ..., and BN forming the storage device 300 with a predetermined reference value; a determination portion 512 that determines an abnormality in the respective storage element blocks B1, B2, ..., and BN from the comparison results from the comparison portion 511 and outputs the determination results to the control portion 520, and a plurality of reference value files 513 connected to both the comparison portion 511 and the determination portion 512 and made up of a plurality of reference values and abnormality contents correlated with the respective reference values. As is shown in FIG. 2B, a plurality of files made up of a plurality of reference values and abnormality contents correlated with the respective reference values are prepared in advance as the reference value files 513, and any one of them is selected according to the comparative content in the comparison portion 511.

Figure 3:
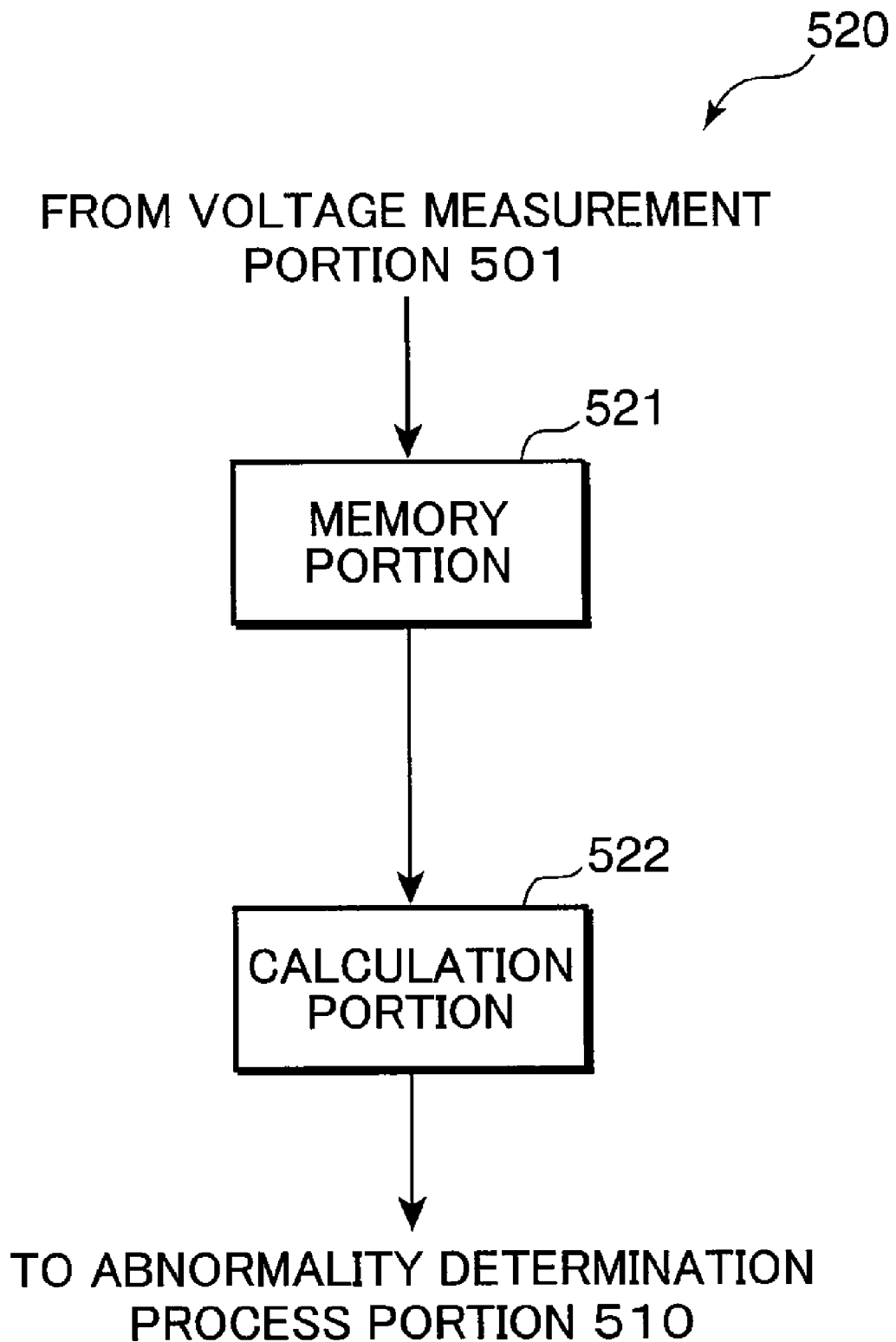
FIG. 3 is a view showing the configuration of a control portion.

The comparison portion 511 receives an input of an abnormality determination voltage calculated from the voltages across the terminals of the respective storage element blocks from the control portion 520 after an elapse of a predetermined time since the end of the equalization process by the equalization process portion 504. It then compares the reference value inside the reference value file 513 with the abnormal determination voltage. The determination portion 512 performs an abnormality determination on the respective storage element blocks on the basis of the comparison result from the comparison portion 511. It is sufficient that the control portion 520 is formed to include, for example, as is shown in FIG. 3, a storage portion 521 that stores the voltage data VD containing voltages across terminals of the respective storage element blocks B1, B2, ..., and BN acquired from the voltage measurement portion 501 and a calculation portion 522 that calculates the abnormality determination voltage, which is used by the comparison portion 511 and the determination portion 512 in the abnormality determination process portion 510, from the voltages across the terminals of the respective storage elements.

Figure 4:
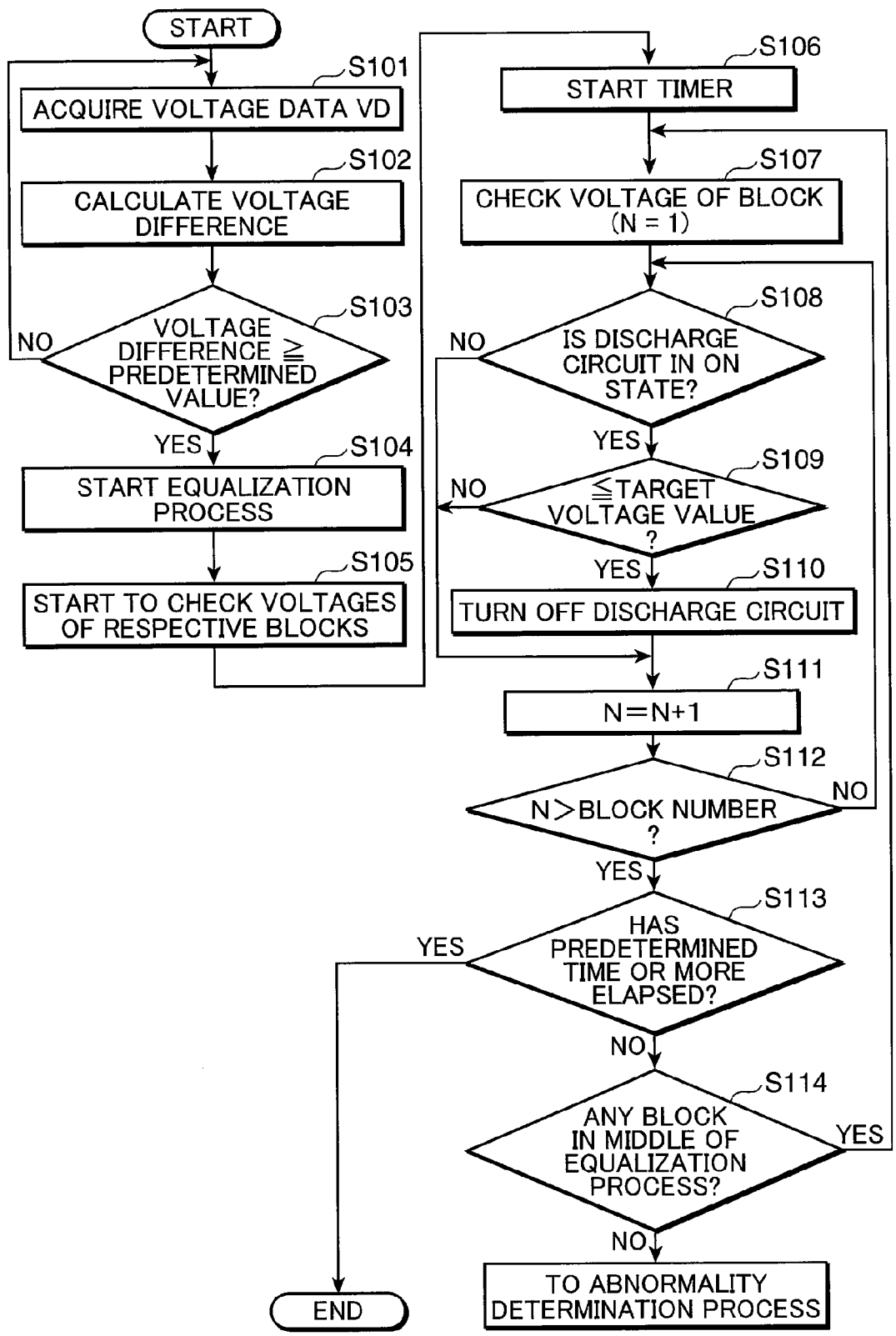
FIG. 4 is a flowchart (first part) depicting the process procedure of an abnormality detecting method for a storage element according to the first embodiment of the invention.
Figure 5:
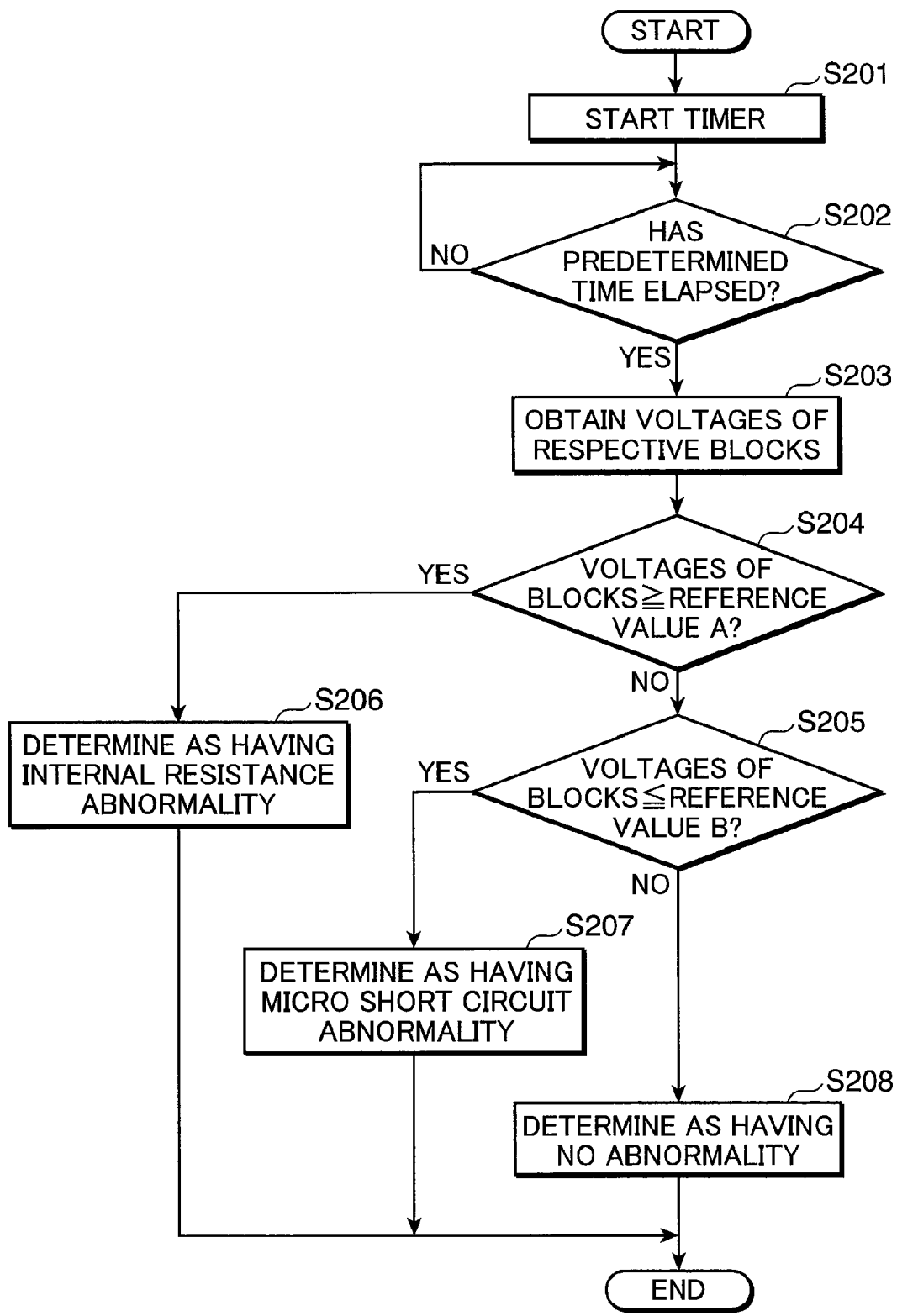
FIG. 5 is a flowchart (second part) depicting the process procedure of the abnormality detecting method for a storage element according to the first embodiment of the invention.

Operations of the abnormality detecting device according to the first embodiment of the invention, that is, the abnormality detecting method for a storage element will now be described. FIG. 4 and FIG. 5 are flowcharts depicting the process procedure of the abnormality detecting method of this embodiment. FIG. 4 is a flowchart depicting the procedure of the equalization process on the storage elements performed by the equalization process portion 504. FIG. 5 is a flowchart depicting the procedure of the abnormality determination process on the storage elements performed by the abnormality determination process portion 510. The abnormality detecting method of this embodiment is to perform the equalization process of FIG. 4 first and thence the abnormality determination process of FIG. 5.

Firstly, the procedure of the equalization process on the storage elements will be described using FIG. 4.

As is shown in FIG. 4, the control portion 520 acquires the voltage data VD containing the voltages across the terminals of the respective storage element blocks B1, B2, ..., and BN forming the storage device 300 from the voltage measurement portion 501 in time series (Step S101). The control portion 520 finds the maximum voltage value and the minimum voltage value among the voltages across the terminals of the respective storage element blocks B1, B2, ..., and BN from the acquired voltage data VD and calculates a voltage difference between the maximum voltage value and the minimum voltage value that have been found (Step S102). It then determines whether the voltage difference is equal to or larger than the predetermine value (Step S103). In a case where the voltage difference is equal to or smaller than the predetermined value (NO in Step S103), the flow returns again to Step S101.

In a case where the calculated voltage difference is equal to or larger than the predetermined value (YES in Step S103), the control portion 520 sets the minimum voltage value found in Step S102 as the target voltage value and issues a command to the equalization process portion 504 to start the equalization process. Upon receipt of the command, the equalization process portion 504 starts the equalization process on all the storage element blocks except for the storage element block having the minimum voltage across the terminals. When the equalization process portion 504 starts the equalization process, it turns ON the discharge circuits 303 of the respective storage element blocks subjected to the equalization process (Step S104).

After the equalization process is started, the equalization process portion 504 starts to check the voltages across the terminals of the respective storage element blocks (Step S105) and starts the internal timer at the same time (Step S106). The equalization process portion 504 then starts to check the voltage across the terminals, for example, from the storage element block B1 (count number N=1) of FIG. 1 (Step S107).

When the discharge circuit 303 of the storage element block B1 is in an ON state (YES in Step S108), the equalization process portion 504 determines whether the voltage across the terminals of the block B1 is equal to or smaller than the target voltage value (Step S109). When the voltage across the terminals of the storage element block B1 is equal to or smaller than the target voltage value (YES in STEP S109), the equalization process portion 504 turns OFF the discharge circuit 303 of the storage element block B1 to end the discharge from the storage elements forming the storage element block B1 (Step S110).

In a case where the discharge circuit of the block B1 is in an OFF state in Step S108 after the discharge circuit 303 of the storage element block B1 is turned OFF in Step S110 (NO in Step S108) or in a case where the voltage across the terminals of the block B1 is larger than the target value in Step S109 (NO in Step S109), the equalization process portion 504 increments the count number N by one (Step S111) and determines whether the incremented count number N has exceeded a total number of the storage element blocks of FIG. 1 (Step S112). When the count number N has not exceeded a total number of blocks (NO in Step S112), the flow returns again to Step S108 and Step S108 through Step S112 are repeated.

In a case where the count number N has exceeded a total number of blocks in Step S112 (YES in Step S112), the equalization process portion 504 determines whether a measurement time of the internal timer started in Step S106 is over a predetermined time (Step S113). In a case where the predetermined time has already elapsed (YES in Step S113), the equalization process is terminated.

In a case where it is determined that the predetermined time has not been elapsed in Step S113 (NO in Step S113) and there is a storage element block in the middle of the equalization process with its discharge circuit 303 being in an ON state in the storage element blocks subjected to the equalization process (YES in Step S114), the flow returns to Step S107 and Step S107 through Step S114 are repeated again starting with the counter number N=1. Meanwhile, in a case where all the discharge circuits 303 are in an OFF state and none of the storage element blocks is in the middle of the equalization process (NO in Step S114), the flow proceeds to the abnormality determination process depicted in FIG. 5.

The procedure of the abnormality determination process on the storage elements will now be described using FIG. 5.

As is shown in FIG. 5, the control portion 520 starts the internal timer and starts to measure an elapsed time since the end of the equalization process of FIG. 4 (Step S201). After the internal timer is started, the charge and discharge control device 400 inhibits charge from the power generator 100 to the storage device 300 and discharge from the storage device 300 to the load device 200 for allowing the respective element blocks to stand.

When a predetermined time has elapsed (YES in Step S202), the abnormality determination process portion 510 obtains the voltages across the terminals of the respective storage elements of FIG. 1 from the control portion 520 (Step S203).

The comparison portion 511 in the abnormality determination process portion 510 compares each of the obtained voltages across the terminals of the respective storage element blocks with a reference value A in the reference value files 513. Herein, in order to make a comparison with the voltages across the terminals of the respective storage element blocks, the comparison portion 511 selects a reference value file consistent with the comparative content from the reference value files 513 (Step S204).

For the storage element blocks having the voltages across the terminals equal to or larger than the reference value A (YES in Step S204), the determination portion 512 determines from the comparison result that these storage element blocks have "an internal resistance abnormality", meaning that the internal resistance is too high (Step S206).

Meanwhile, for the storage element blocks having the voltages across the terminals equal to or smaller than the reference value A (NO in Step S204), the comparison portion 511 further makes a comparison with a reference value B (Step S205). For the storage element blocks having the voltages equal to or smaller than the reference value B (YES in Step S205), the determination portion 512 determines from the comparison result that these storage element blocks have "a micro short circuit abnormality", meaning that a micro short circuit is occurring (Step S207), whereas it determines that the storage element blocks having the voltages equal to or larger than the reference value B have no abnormality (Step S208). The abnormality determination process ends when the determination ends for all the storage element blocks.

As has been described, according to the first embodiment of the invention, an abnormality determination is performed on the respective storage element blocks using the respective voltages across the terminals after an elapse of the predetermined time since the end of the equalization process performed on the respective storage element blocks. Hence, when an abnormality in the respective storage element blocks is checked, there will be no influences of a variance in capacity and the states of charge of the respective storage element blocks. It thus becomes possible to improve accuracy of an abnormality determination on the respective storage element blocks. Further, by determining an abnormality in the respective storage element blocks at high accuracy, it becomes possible to detect deterioration of the storage device made up of these storage element blocks precisely, which in turn makes it possible to upgrade the safety of the storage device.

This embodiment has described the power supply system using the power generator that generates electric power from natural energy. The invention, however, is not limited to this description. For example, the invention is also applicable to a power supply system equipped with a storage device utilizing nighttime electric power, for example, the load leveling power supply and the plug-in HEV.

Figure 2:
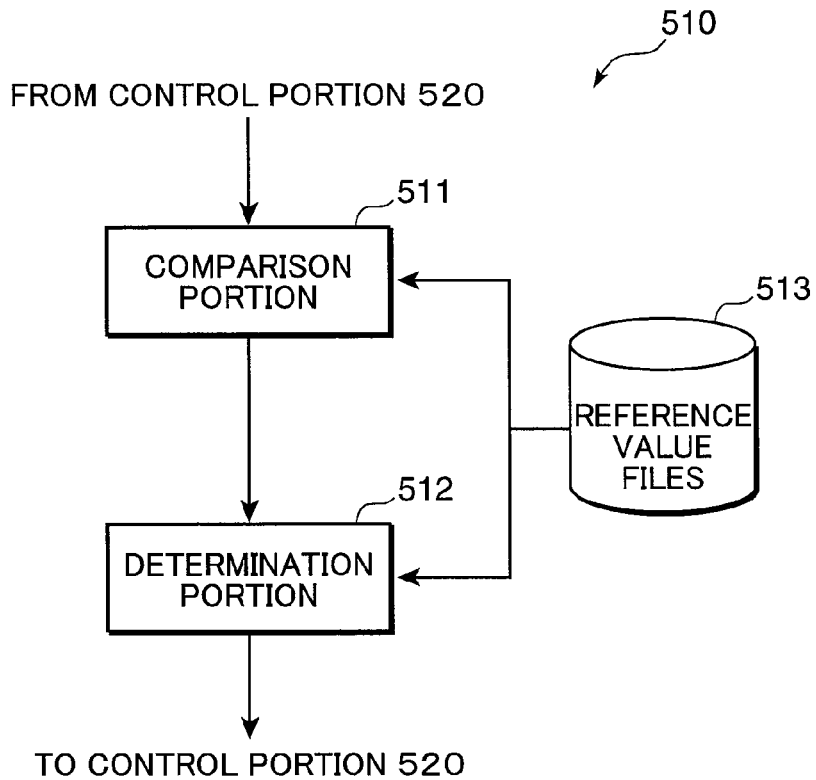
FIG. 2A is a view showing the configuration of an abnormality determination process portion and FIG. 2B is a view used to describe reference value files.

In addition, regarding the reference values in the reference value files 513 of FIG. 2, by using a value corrected on the basis of the remaining capacity, SOC, of the storage device 300 by the temperature measurement portion 503 and the control portion 520, it becomes possible to improve accuracy of the abnormality determination process by the abnormality determination process portion 510. In the case of an application where the temperature of the storage device 300 varies significantly, the reference value can be corrected also using the temperature data T outputted from the temperature measurement portion 503.

Further, the abnormality detecting method of this embodiment may be achieved by running a program on a micro computer. More specifically, the abnormality detecting method can be achieved by installing an abnormality detecting program to achieve the respective process steps depicted in FIG. 4 and FIG. 5 in a micro computer and running the abnormality detecting program thereon.

By reading the abnormality detecting program for a storage element by the micro computer to run the program thereon, the abnormality detecting method by the abnormality detecting device 500 can be achieved. It is sufficient to install the program in a memory portion of the micro computer and run this program on the central processing unit (CPU) of the micro computer.

It is also possible to furnish the capability of the abnormality detecting device 500 with the charge and discharge control device 400 of FIG. 1. In this case, it is sufficient, for example, to install the abnormality detecting program described above in the micro computer forming the charge and discharge control device 400 to run the program thereon. It goes without saying that the capability of the charge and discharge control device 400 can be furnished to the abnormality detecting device 500. Further, the capability of the abnormality detecting device 500 can be furnished to the load device 200 of FIG. 1.

Second Embodiment

A second embodiment of the invention will now be described. The abnormality detecting method of the first embodiment above is to perform an abnormality determination using the voltages across the terminals of the respective storage element blocks when a predetermined time has elapsed since the end of the equalization process in the abnormality determination process of FIG. 5. By contrast, an abnormality detecting method of this embodiment is to perform the abnormality determination process using a difference of the voltages across the terminals of different storage element blocks when a predetermined time has elapsed. By using this difference, it becomes possible to improve accuracy of the abnormality determination further than in the first embodiment above.

Figure 6:
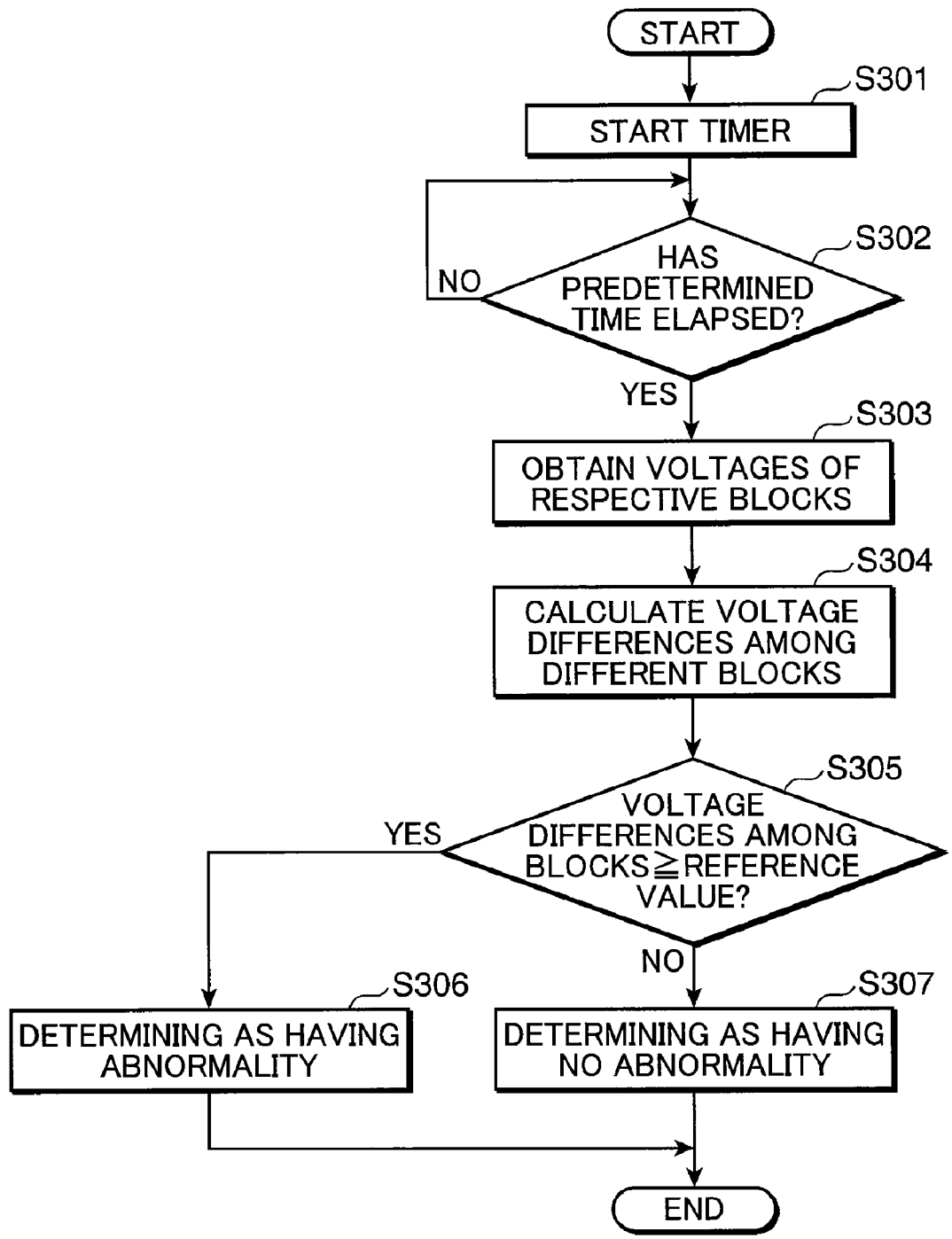
FIG. 6 is a flowchart depicting the process procedure of an abnormality detecting method for a storage element according to a second embodiment of the invention.

The abnormality detecting method according to the second embodiment of the invention will be described in the following. The equalization process by the abnormality detecting method of this embodiment is the same as that in the first embodiment above. Accordingly, the abnormality determination process after the end of the equalization process will be described in the following. An abnormality detecting device that performs the abnormality detecting method of this embodiment can be achieved by the same configuration as that in the first embodiment above. FIG. 6 is a flowchart depicting the procedure of the abnormal determination process of this embodiment.

As is shown in FIG. 6, the control portion 520 starts the internal timer and starts measuring an elapse time since the end of the equalization process of FIG. 4 (Step S301). After the internal timer is started, the charge and discharge control device 400 inhibits charge from the power generator 100 to the storage device 300 and discharge from the storage device 300 to the load device 200 for allowing the respective storage element blocks to sand.

When the predetermined time has elapsed (YES in Step S302), the control portion 520 obtains the voltages across the terminals of the respective storage element blocks B1, B2, . . . , and BN of FIG. 1 from the voltage data VD (Step S303). It then calculates differences in the voltages across the terminals among different storage element blocks and outputs the differences to the abnormality determination process portion 510 (Step S304).

The comparative portion 511 in the abnormality determination process portion 510 then compares differences in the voltages across the terminals among different storage element blocks with a predetermined reference value in the reference value files 513. Herein, in order to make a comparison with the differences in the voltages across the terminals among different storage element blocks, the comparison portion 511 selects a reference value file consistent with the comparative content from the reference value files 513 (Step S305).

For the storage element blocks having a difference of the voltages across the terminals equal to or larger than the selected reference value (YES in Step S305), the determination portion 512 determines from the comparison results that these storage element blocks have "an abnormality" (Step S306). Meanwhile, for the storage element blocks having a difference of voltages across the terminals equal to or smaller than the reference value (NO in Step S305), it determines that these storage element blocks have no abnormality (Step S307). The abnormality determination process ends when the determination on all the storage element blocks ends.

As has been described, according to the second embodiment of the invention described above, an abnormality determination is performed on the respective storage element blocks using differences in the voltages across the terminals among different blocks after an elapse of the predetermined time since the end of the equalization process on the respective storage element blocks. Accordingly, when an abnormality in the respective storage element blocks is checked, there will be no influences of a variance in capacity and the states of charge of the respective storage element blocks. It thus becomes possible to improve accuracy of the abnormality determination on the respective storage element blocks. Further, by determining an abnormality in the respective storage element blocks at high accuracy, it becomes possible to detect deterioration of the storage device formed of these storage element blocks precisely, which can in turn upgrade the safety of the storage device.

In this embodiment, differences in the voltages across the terminals among different blocks are used as voltage differences used for an abnormality determination. The differences can be simply a difference of the voltages across the terminals between adjacent blocks (for example, the blocks B1 and B2 of FIG. 1) or differences between the average value of the voltages across the terminals of all the blocks and the voltages across the terminals of the respective blocks. Further, a difference between the maximum voltage across the terminals and the minimum voltage across the terminals among all the blocks can be used as well.

Alternatively, instead of differences in voltages across the terminals among different blocks, ratios of the voltages across the terminals among different blocks may be used. For example, a ratio of the voltages across the terminals of the blocks B1 and B2 of FIG. 1 is a percentage of a voltage V2 across the terminals of the block B2 with respect to a voltage V1 across the terminals of the block B1 (or a percentage of the voltage V1 across the terminals of the block B1 with respect to the voltage V2 across the terminals of the block B2).

Third Embodiment

A third embodiment of the invention will now be described. According to the abnormality detecting methods of the first and second embodiments above, the voltages across the terminals of the respective storage element blocks and differences in voltages across the terminals are calculated after an elapse of the predetermined time since the base point set at the end of the equalization process on all the storage element blocks B1, B2, . . . , and BN in the abnormality determination processes in FIG. 5 and FIG. 6. By contrast, an abnormality detecting method of this embodiment is to perform the abnormality determination process using a voltage across the terminals after an elapse of a predetermined time since the end of the equalization process on each storage element block.

Figure 7:
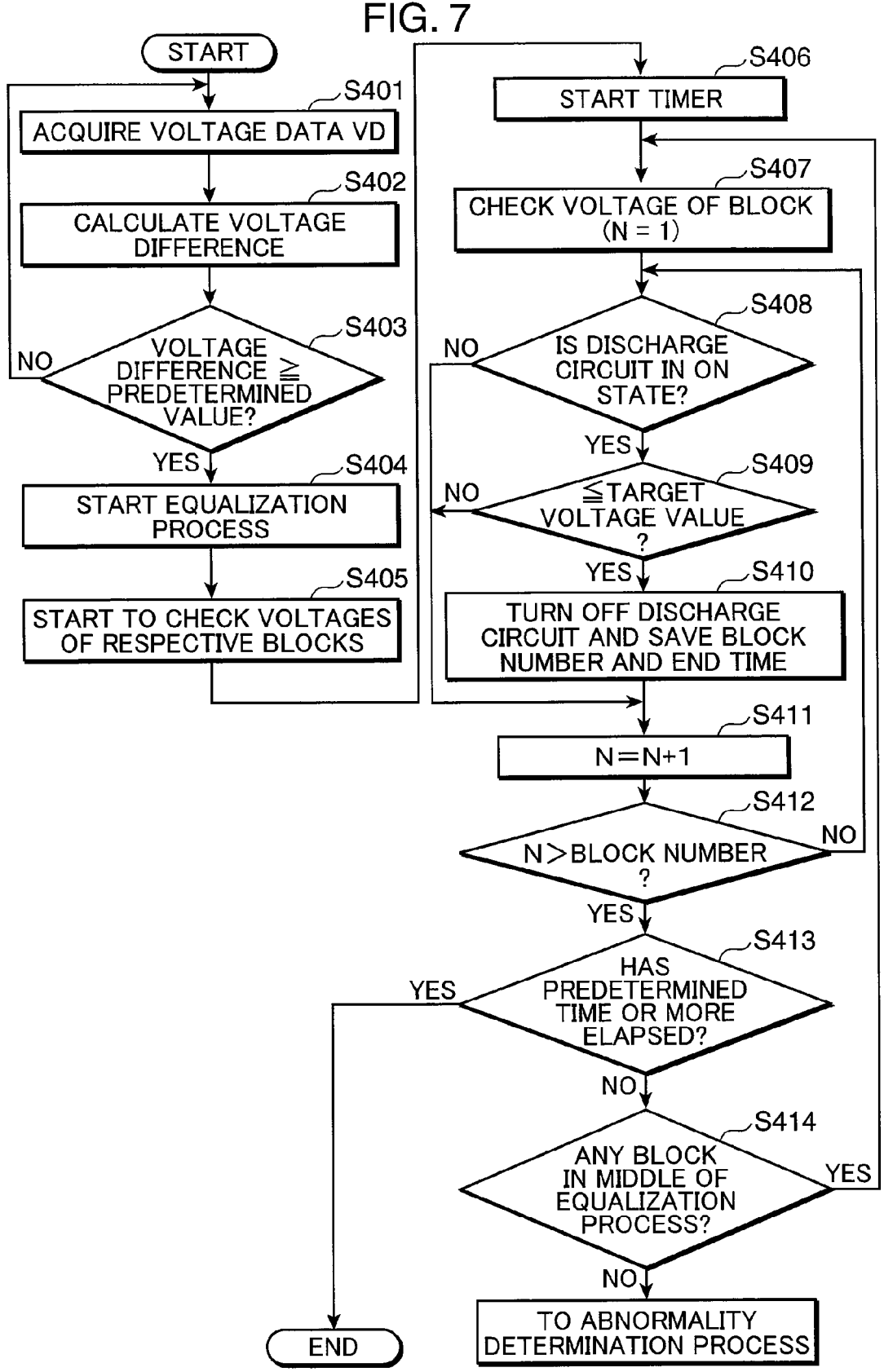
FIG. 7 is a flowchart (first part) depicting the process procedure of an abnormality detecting method for a storage element according to a third embodiment of the invention.
Figure 8:
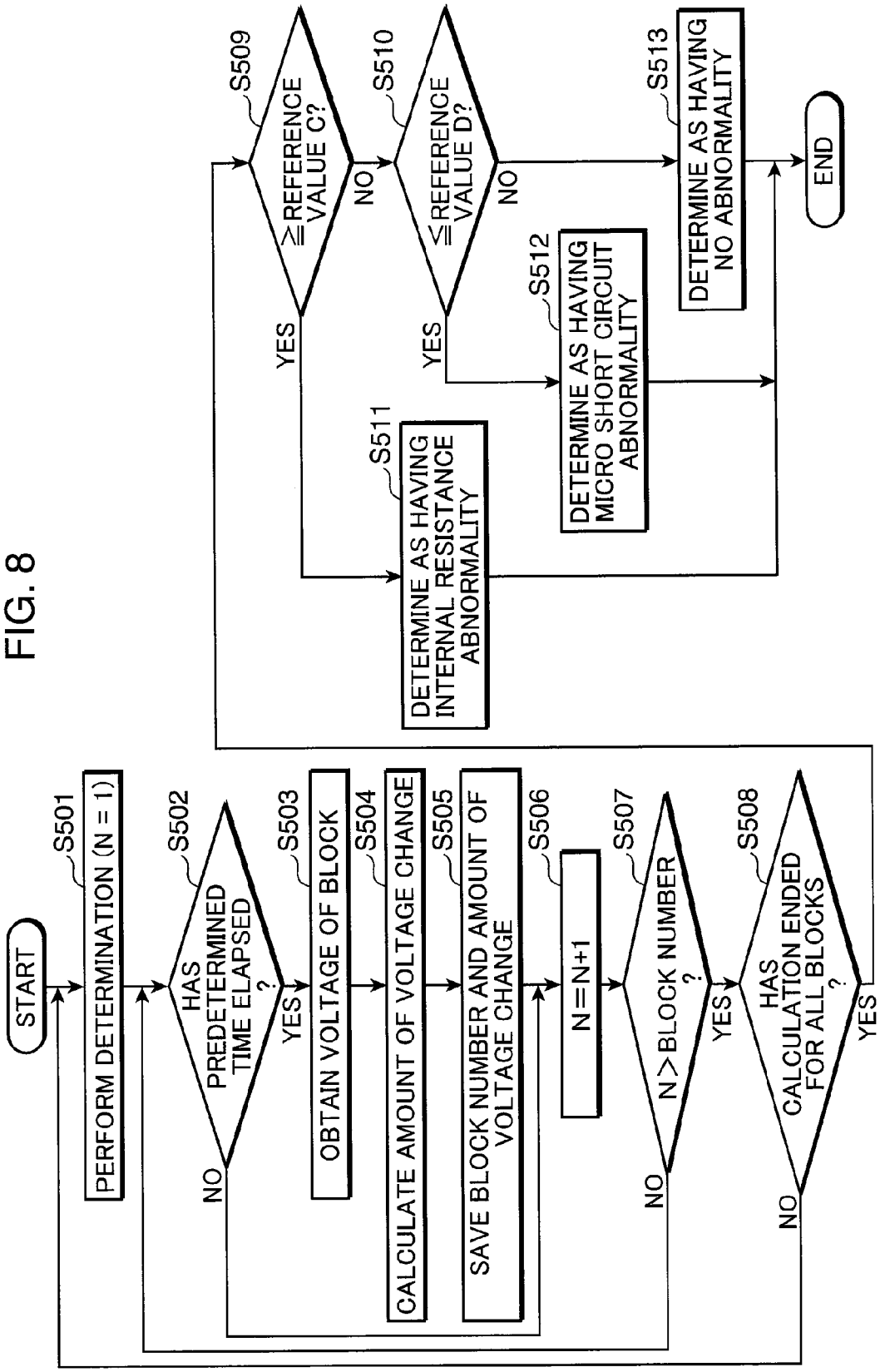
FIG. 8 is a flowchart (second part) depicting the process procedure of the abnormality detecting method for the storage element according to the third embodiment of the invention.

An abnormality detecting method for the storage elements according to the third embodiment of the invention will be described in the following. FIG. 7 is a flowchart depicting the procedure of the equalization process of this embodiment. FIG. 8 is a flowchart depicting the procedure of the abnormality determination process of this embodiment. The abnormality detecting method of this embodiment is to perform the equalization process of FIG. 7 first and thence the abnormality determination process of FIG. 8. An abnormality detecting device that performs the abnormality detecting method of this embodiment can be achieved by the same configuration as that in the first embodiment above.

Firstly, the procedure of the equalization process on the storage elements will be described using FIG. 7.

As is shown in FIG. 7, the control portion 520 acquires the voltage data VD containing the voltages across the terminals of the respective storage elements blocks B1, B2, . . . , and BN forming the storage device 300 from the voltage measurement portion 501 in time series (Step S401). The control portion 520 then finds the maximum voltage value and the minimum voltage value among the voltages across the terminals of the respective storage element blocks B1, B2, . . . , and BN from the acquired voltage data VD and calculates a voltage difference between the maximum voltage value and the minimum voltage value that have been found (Step S402). It then determines whether the voltage difference is equal to or larger than a predetermined value (Step S403). In a case where the voltage difference is equal to or smaller than the predetermined value (NO in Step S403), the flow returns again to Step S401.

In a case where the calculated voltage difference is equal to or larger than the predetermined value (YES in Step S403), the control portion 520 sets the minimum voltage value found in Step S402 as the target voltage value and issues a command to the equalization process portion 504 to start the equalization process. Upon receipt of the command, the equalization process portion 504 starts to perform the equalization process on all the storage element blocks except for the storage element block having the minimum voltage across the terminals. When the equalization process portion 504 starts the equalization process, it turns ON the discharge circuits 303 of the respective storage element blocks subjected to the equalization process (Step S404).

After the equalization process is started, the equalization process portion 504 starts to check voltages across the terminals of the respective storage element blocks (Step S405) and starts the internal timer at the same time (Step S406). The equalization process portion 504 then starts to check the voltage across the terminals, for example, from the storage element block B1 (count number N=1) of FIG. 1 (Step S407).

In a case where the discharge circuit 303 of the storage element block B1 is in an ON state (YES in Step S408), the equalization process portion 504 determines whether the voltage across the terminals of the block B1 is equal to or smaller than the target voltage value (Step S409). In a case where the voltage across the terminals of the storage element block B1 is equal to or smaller than the target voltage value (YES in Step S409), the equalization process portion 504 turns OFF the discharge circuit 303 of the block B1 to end the discharge from the storage elements forming the block B1. In this embodiment, the equalization process portion 504 further notifies the control portion 520 of the block number "B1" of the block B1 and the discharge end time, so that the control portion 520 saves the notified contents (Step S410).

In a case where the discharge circuit of the storage element block B1 is still in an OFF state in Step S408 after the discharge circuit 303 of the block B1 is turned OFF in Step S410 (NO in Step S408), or in a case where the voltage across the terminals of the block B1 in Step S409 is equal to or larger than the target value (NO in Step S409), the equalization process portion 504 increments the count number N by one (Step S411) and determines whether the incremented count number N exceeds a total number of the storage element blocks of FIG. 1 (Step S412). In a case where the count number N has not exceeded a total number of the blocks (NO in Step S412), the flow returns again to Step S408 and Steps S408 through S412 are repeated.

In a case where the count number N has exceeded a total number of blocks in Step S412 (YES in Step S412), the equalization process portion 504 determines whether a measurement time of the internal timer started in Step S406 is over a predetermined time (Step S413). In a case where the predetermined time has already elapsed (YES in Step S413), the equalization process is terminated.

In a case where it is determined that the predetermined time has not been elapsed in Step S413 (NO in Step S413) and there is a storage element block in the middle of the equalization process with its discharge circuit 303 being in an ON state in the storage element blocks subjected to the equalization process (YES in Step S414), the flow returns to Step S407 and Step S407 through Step S414 are repeated again starting with the counter number N=1. Meanwhile, when all the discharge circuits 303 are in an OFF state and none of the storage element blocks is in the middle of the equalization process (NO in Step S414), the flow proceeds to the abnormality determination process depicted in FIG. 8.

The procedure of the abnormality determination process on the storage elements will now be described using FIG. 8.

As is shown in FIG. 8, the control portion 520 starts the abnormality determination process, for example, from the storage element block B1 (counter number N=1) of FIG. 1 (Step S501). When the equalization process described above ends, the charge and discharge control device 400 inhibits charge from the power generator 100 to the storage device 300 and discharge from the storage device 300 to the load device 200 for allowing the respective storage element blocks to stand.

The control portion 520 determines whether a predetermined time has elapsed since the time when the equalization process on the block B1 ended using the discharge end time of the block B1 saved in Step S410 of FIG. 7 (Step S502). After the predetermined time (YES in Step S502), the control portion 520 obtains the voltage across the terminals of the storage element block B1 from the voltage data VD from the voltage measurement portion 501 (Step S503). The control portion 520 calculates an amount of voltage change in the predetermined time on the basis of a difference between the obtained voltage across the terminals and the target voltage value set in Step S404 of FIG. 7 (Step S504) and saves the block number "B1" of the block B1 and the amount of voltage change therein (Step S505).

In a case where the predetermined time has not elapsed in Step S502 (NO in Step S502), the control portion 520 increments the count number N by one (Step S506) and determines whether the incremented count number N has exceeded a total number of the storage element blocks of FIG. 1 (Step S507). In a case where the count number N has not exceeded a total number of the blocks (NO in Step S507), the flow returns again to Step S502 and Step S502 through Step S507 are performed on the next storage element block, herein, the block B2. Likewise, Step S502 through Step S507 are repeated until it is determined that the count number has exceeded a total number of the storage element blocks in Step S507.

In a case where the count number N has exceeded a total number of the storage element blocks in Step S507 (YES in Step S507), the control portion 520 determines whether an amount of voltage change has been calculated for all the storage element blocks (Step S508). When it is determined that an amount has not been calculated for all the blocks (NO in Step S508), the flow returns to Step S501 and Step S501 through Step S508 are repeated.

In a case where it is determined that an amount of voltage change has been calculated for all the storage element blocks B1, B2, . . . , and BN in Step S508 (YES in Step S508), the abnormality determination process portion 510 of FIG. 1 obtains amounts of voltage change of the respective blocks from the control portion 520 and the comparison portion 511 in the abnormality determination process portion 510 compares each of the amounts of voltage change of the respective storage element blocks with a reference value C in the reference value files 513. Herein, in order to make a comparison with the amounts of voltage change of the respective storage element blocks, the comparison portion 511 selects a reference value file consistent with the comparative content from the reference value files 513 (Step S509).

For the blocks having the amounts of voltage change equal to or larger than the reference value C (YES in Step S509), the determination portion 512 determines that these blocks have, for example, "an internal resistance abnormality" (Step S511). In a case where the amounts of voltage change are less than the reference value C (NO in Step S509), the comparison portion 511 continuously makes a comparison with a reference value D (Step S510).

For the blocks having the amounts of voltage change equal to or smaller than the reference value D (YES in Step S510), the determination portion 512 determines that these blocks have, for example, "a micro short circuit abnormality" (Step S512). For the blocks having the amounts of voltage change exceeding the reference value D (NO in Step S510), the determination portion 512 determines that these blocks have no abnormality (Step S513). The abnormality determination process ends when the determination on all the storage element blocks ends.

As has been described, according to the third embodiment of the invention, an abnormality determination on each storage element block is performed using an amount of change of the voltage across the terminals since the end of the equalization process on each storage element block until an elapse of the predetermined time. Hence, when an abnormality in the respective storage element blocks is checked, there will be no influences of a variance in capacity and the states of charge of the respective storage element blocks. It thus becomes possible to improve accuracy of the abnormality determination on the respective storage element blocks. Further, by determining an abnormality in the respective storage element blocks at high accuracy, it becomes possible to detect deterioration of the storage device formed of these storage element blocks precisely, which can in turn upgrade the safety of the storage device.

In this embodiment, amounts of change of the voltages across the terminals of the respective storage element blocks are used for the abnormality determination on the storage element blocks. Alternatively, for example, a difference between the maximum amount of change and the minimum amount of change among all the blocks may be used. Also, a rate of voltage change in a predetermined period or a difference between the maximum rate of voltage change and the minimum rate of voltage change among the blocks in the storage device 300 in a predetermined period may be used as well. Further, differences between an average value of amounts of voltage change or the rates of voltage change and amounts of voltage change or the rates of voltage change of the respective blocks in the storage device 300 may be used.

In this embodiment, as in Step S501 through Step S508 of FIG. 8, the abnormality determination is performed after an amount of voltage change of each block is calculated. The invention, however, is not limited to this configuration. A series of abnormality determinations may be performed on each block and then the abnormality determination on the next block may be performed.

From the respective embodiments above, the invention can be summarized as follows. That is, an abnormality detecting device for a storage element according to one aspect of the invention includes: an equalization process portion that eliminates a variance of states of charge of a plurality of storage portions including at least one storage element so as to make the states of charge of the plurality of storage portions equal; an abnormality determination portion that determines an abnormality in the respective storage portions; a voltage measurement portion that measures voltages across terminals of the respective storage portions; and a control portion that obtains the voltages across the terminals of the respective storage portions from the voltage measurement portion and controls an equalization process by the equalization process portion and an abnormality determination process by the abnormality determination process portion on the basis of the voltages across the terminals of the respective storage portions. The control portion has a calculation portion that calculates an abnormality determination value used in the abnormality determination process on the basis of an amount of change of the voltages across the terminals of the respective storage portions that have been allowed to stand since an end of the equalization process on the respective storage portions. The abnormality determination process portion has a determination portion that performs an abnormality determination from the abnormality determination value. The storage portions referred to herein mean, for example, the storage element blocks B1, B2, . . . , and BN formed of at least one storage element as is shown in FIG. 1. It should be appreciated that the number and a manner of connections are not limited to those specified in the configuration of FIG. 1 and it is sufficient to combine at least one storage element.

In the abnormality detecting device for a storage element described above, an abnormality determination is performed on the respective storage portions using an amount of change of the voltages across the terminals of the respective storage portions caused by allowing the respective storage portions to stand after the states of charge of the respective storage portions are made equal. It thus becomes possible to perform a determination on the basis of an amount of change of the voltages across the terminals when the storage devices are allowed to stand after a variance in capacity and a variance of states of charge, such as a variance in voltage, of the respective storage devices are eliminated. Hence, because there will be no influences of a variance of the states of charge, accuracy of the abnormality determination on the respective storage portions can be improved. In addition, by determining an abnormality in the respective storage portions at high accuracy, it becomes possible to detect deterioration of these storage portions precisely, which can in turn upgrade the safety of the storage portions.

The abnormality detecting device described above performs an abnormality determination on the respective storage portions using only an amount of change of the voltages across the terminals after they are allowed to stand. It is therefore unnecessary to forcedly discharge the respective storage portions. Accordingly, remaining capacities of the respective storage portions will not be actively reduced for an abnormality determination and electric power that can otherwise be fed to the load device will not be consumed unnecessarily. In addition, because an amount of change caused by merely allowing the storage portions to stand is used, there is no need for a configuration of a control system required when the storage portions are forcedly discharged as described above. It thus becomes possible to achieve an inexpensive detecting device.

The abnormality detecting portion described above can be incorporated, for example, in a power supply system equipped with a storage device having a set of a plurality of storage portions. The power supply system can be a power supply system using a power generator that generates electric power from natural energy, and a power supply system equipped with a storage device that utilizes nighttime electric power, such as a load leveling power supply and a plug-in HEV. By applying the abnormality detecting device to the storage device in the power supply systems as above, it becomes possible to upgrade the safety of the storage device.

It is preferable that the abnormality determination process portion further has a reference value file containing a plurality of sets each made up of a reference value and an abnormality content correlated with the reference value, and a comparison portion that compares the abnormality determination value with each reference value contained in the reference value file, and that the determination portion determines whether each storage portion is consistent with the abnormality content correlated with each reference value compared with the abnormality determination value by the comparison portion on the basis of a comparison result from the comparison portion.

In this case, by preparing the reference value file including a plurality of sets each made up of a reference value necessary in the abnormality determination and an abnormality content correlated with the reference value, it becomes possible to determine the abnormality content efficiently by referring to the reference value file on the basis of the comparison result between the abnormality determination and the reference value when the abnormality determination is performed. It thus becomes possible to shorten a time needed for the abnormality determination and simplify the process content of the abnormality determination.

It is preferable that the calculation portion calculates the abnormality determination value on the basis of an amount of change of the voltages across the terminals of the respective storage portions that have been allowed to stand for a predetermined time since and an end of all equalization processes on the respective storage portions.

In this case, a time elapsed since the end of all the equalization processes on the respective storage portions is used as a time for allowing the respective storage portions to stand since the end of the equalization process. It thus becomes possible to measure the time for allowing all the storage portions to stand by a single measurement operation, which can simplify the configuration for the time measurement.

It is preferable that the calculation portion calculates the abnormality determination value on the basis of an amount of change of the voltages across the terminals of the respective storage portions that have been allowed to stand for a predetermined time since an end of each equalization process on the plurality of storage portions.

In this case, a time elapsed since the end of each equalization process on the storage portions is used separately as the time for allowing the respective storage portions to stand since the end of the equalization process on the respective storage portions. It thus becomes possible to understand exactly the time for allowing the respective storage portions to stand. Accordingly, an amount of change of the voltages across the terminals of the respective storage portions becomes more precise, which can improve accuracy of the abnormality determination value.

It is preferable that the abnormality determination value is a difference or a ratio of an amount of change of a voltage across the terminals of one storage portion among the plurality of storage portions and an amount of change of a voltage across the terminals of another storage portion.

In this case, because a difference or a ratio of an amount of change of the voltage across the terminals of one storage portion and an amount of change of the voltage across the terminals of another storage portion is used as the abnormality determination value, the abnormality determination value can be simpler. It thus becomes possible to accelerate the abnormality determination process.

An abnormality detecting method for a storage element according to another aspect of the invention includes: a first step of making states of charge of a plurality of storage portions including at least one storage element equal in a case where there is a variance of the states of charge of the plurality of storage portions; a second step of measuring an amount of change of voltages across terminals of the respective storage portions that have been allowed to stand since an end of an equalization process on the respective storage portions; a third step of comparing an abnormality determination value calculated from the amount of change of the voltages across the terminals of the respective storage portions with a reference value selected from a plurality of reference values prepared in advance; and a fourth step of determining whether the respective storage portions are consistent with an abnormality content correlated with the selected reference value on the basis of the comparison result.

According to the abnormality detecting method for a storage element described above, in a case where there is a variance in capacity or a variance of the states of charge in voltage of a plurality of storage portions, the variance of the states of charge is eliminated first and then a plurality of the storage portions are allowed to stand. An abnormality determination on the respective storage portions is performed from an amount of change of the voltages across the terminals of the respective storage portions caused by allowing the storage portions to stand after the equalization process. Hence, a variance in capacity of the storage portions will have no influences on a calculation of the abnormality determination value used in the abnormality determination. It thus becomes possible to improve accuracy of the determination.

According to the abnormality detecting method for a storage element described above, a determination is performed using an amount of change of the voltages across the terminals caused by allowing the storage portions to stand. Hence, a period in which the respective storage portions are neither charged nor discharged can be used for the abnormality determination on the respective storage portions. This eliminates the need to separately secure a time for the abnormality determination. It thus becomes possible to improve the utilization efficiency of the storage portions.

An abnormality detecting program for a storage element according to still another aspect of the invention causes a computer to perform processing including: a first step of requesting to make states of charge of a plurality of storage portions including at least one storage element equal upon notice of an occurrence of a variance of the states of charge of the plurality of storage portions; a second step of requesting to measure an amount of change of voltages across terminals of the respective storage portions that have been allowed to stand since an end of an equalization process on the respective storage portions; a third step of selecting, upon receipt of an input of an abnormality determination value calculated from the amount of change of the voltages across the terminals of the respective storage portions, one reference value from a plurality of reference values prepared in advance and comparing the abnormality determination value with the selected reference value; and a fourth step of searching for an abnormality content correlated with the selected reference value and determining whether the respective storage portions are consistent with the searched abnormality content on the basis of the comparison result.

According to the abnormality detecting program for a storage element described above, in a case where there is a variance in capacity or a variance of the states of charge in voltage of a plurality of storage portions, the computer running the program eliminates the variance of the states of charge first and then allows a plurality of the storage portions to stand. It then performs an abnormality determination on the storage portions from an amount of change of the voltages across the terminals of the respective storage portions caused by allowing the storage portions to stand after the equalization process. Hence, a variance in capacity of the storage portions will have no influences on a calculation of the abnormality determination value used in the abnormality determination. It thus becomes possible to improve accuracy of the determination.

According to the abnormality detecting program for a storage element described above, the computer running the program performs a determination using an amount of change of the voltages across the terminals caused by allowing the storage portions to stand. Hence, a period in which the respective storage portions are neither charged nor discharged can be used for the abnormality determination on the respective storage portions. This eliminates the need to separately secure a time for the abnormality determination. It thus becomes possible to improve the utilization efficiency of the storage portions.

A computer-readable recording medium in which is recorded an abnormality detecting program for a storage element according to still another aspect of the invention causes a computer to perform processing including: a first step of requesting to make states of charge of a plurality of storage portions including at least one storage element equal upon notice of an occurrence of a variance of the states of charge of the plurality of storage portions; a second step of requesting to measure an amount of change of voltages across terminals of the respective storage portions that have been allowed to stand since an end of an equalization process on the respective storage portions; a third step of selecting, upon receipt of an input of an abnormality determination value calculated from the amount of change of the voltages across the terminals of the respective storage portions, one reference value from a plurality of reference values prepared in advance and comparing the abnormality determination value with the selected reference value; and a fourth step of searching for an abnormality content correlated with the selected reference value and determining whether the respective storage portions are consistent with the searched abnormality content on the basis of the comparison result.

According to the computer-readable recording medium in which is recorded the abnormality detecting program for a storage element described above, in a case where there is a variance in capacity or a variance of the states of charge in voltage of a plurality of storage portions, the computer running the program recorded in the recording medium eliminates the variance of the states of charge first and then allows a plurality of the storage portions to stand. It then performs an abnormality determination on the storage portions from an amount of change of the voltages across the terminals of the respective storage portions caused by allowing the storage portions to stand after the equalization process. Hence, a variance in capacity of the storage portions will have no influences on a calculation of the abnormality determination value used in the abnormality determination. It thus becomes possible to improve accuracy of the determination.

According to the computer-readable recording medium in which is recorded the abnormality detecting program for a storage element described above, the computer running the program recorded in the recording medium performs a determination using an amount of change of the voltages across the terminals caused by allowing the storage portions to stand. Hence, a period in which the respective storage portions are neither charged nor discharged can be used for the abnormality determination on the respective storage portions. This eliminates the need to separately secure a time for the abnormality determination. It thus becomes possible to improve the utilization efficiency of the storage portions.

It should be appreciated that the embodiments of the invention disclosed herein are merely illustrative and not restrictive. The scope of the invention is therefore defined not by the contents disclosed herein but by the scope of the appended claims and it is understood that all modifications equivalent to and within the scope of appended claims are included in the invention.

INDUSTRIAL APPLICABILITY

The abnormality detecting device for a storage element, the abnormality detecting method for a storage element, an abnormality detecting program for a storage element, and a computer-readable recording medium in which an abnormality detecting program is recorded of the invention are useful for a power supply system and a power supply device having an equalization process on the storage device and therefore have an industrial applicability.

The invention claimed is:

1. An abnormality detecting device for a storage element, characterized by comprising:
   an equalization process portion that eliminates a variance of states of charge of a plurality of storage portions including at least one storage element so as to make the states of charge of the plurality of storage portions equal;
   an abnormality determination portion that determines an abnormality in the respective storage portions;
   a voltage measurement portion that measures voltages across terminals of the respective storage portions; and
   a control portion that obtains the voltages across the terminals of the respective storage portions from the voltage measurement portion and controls an equalization process by the equalization process portion and an abnormality determination process by the abnormality determination process portion on the basis of the voltages across the terminals of the respective storage portions,
   wherein:
   the control portion has a calculation portion that calculates an abnormality determination value used in the abnormality determination process on the basis of an amount of change of the voltages across the terminals of the respective storage portions that have been allowed to stand since an end of the equalization process on the respective storage portions; and
   the abnormality determination process portion has a determination portion that performs an abnormality determination from the abnormality determination value.

2. The abnormality detecting device for a storage element according to claim 1, wherein:
the abnormality determination process portion further has a reference value file containing a plurality of sets each made up of a reference value and an abnormality content correlated with the reference value, and a comparison portion that compares the abnormality determination value with each reference value contained in the reference value file; and
the determination portion determines whether each storage portion is consistent with the abnormality content correlated with each reference value compared with the abnormality determination value by the comparison portion on the basis of a comparison result from the comparison portion.

3. The abnormality detecting device for a storage element according to claim 1, wherein:
the calculation portion calculates the abnormality determination value on the basis of an amount of change of the voltages across the terminals of the respective storage portions that have been allowed to stand for a predetermined time since an end of all equalization processes on the respective storage portions.

4. The abnormality detecting device for a storage element according to claim 1, wherein:
the calculation portion calculates the abnormality determination value on the basis of an amount of change of the voltages across the terminals of the respective storage portions that have been allowed to stand for a predetermined time since an end of each equalization process on the plurality of storage portions.

5. The abnormality detecting device for a storage element according to claim 1, wherein:
the abnormality determination value is a difference or a ratio of an amount of change of a voltage across the terminals of one storage portion of the plurality of storage portions and an amount of change of a voltage across the terminals of another storage portion.

6. An abnormality detecting method for a storage element, characterized by comprising:
a first step of making states of charge of a plurality of storage portions including at least one storage element equal in a case where there is a variance of the states of charge of the plurality of storage portions;
a second step of measuring an amount of change of voltages across terminals of the respective storage portions that have been allowed to stand since an end of an equalization process on the respective storage portions;
a third step of comparing an abnormality determination value calculated from the amount of change of the voltages across the terminals of the respective storage portions with a reference value selected from a plurality of reference values prepared in advance; and
a fourth step of determining whether the respective storage portions are consistent with an abnormality content correlated with the selected reference value on the basis of the comparison result.

7. The abnormality detecting method for a storage element according to claim 6, wherein:
the second step includes a step of measuring the amount of change of the voltages across the terminals of the respective storage portions that have been allowed to stand for a predetermined time since an end of all equalization processes on the respective storage portions.

8. The abnormality detecting method for a storage element according to claim 6, wherein:
the second step includes a step of measuring the amount of change of the voltages across the terminals of the respective storage portions that have been allowed to stand for a predetermined time since an end of each equalization process on the plurality of storage portions.

9. An abnormality detecting program for a storage element, characterized by causing a computer to perform processing including:
a first step of requesting to make states of charge of a plurality of storage portions including at least one storage element equal upon notice of an occurrence of a variance of the states of charge of the plurality of storage portions;
a second step of requesting to measure an amount of change of voltages across terminals of the respective storage portions that have been allowed to stand since an end of an equalization process on the respective storage portions;
a third step of selecting, upon receipt of an input of an abnormality determination value calculated from the amount of change of the voltages across the terminals of the respective storage portions, one reference value from a plurality of reference values prepared in advance and comparing the abnormality determination value with the selected reference value; and
a fourth step of searching for an abnormality content correlated with the selected reference value and determining whether the respective storage portions are consistent with the searched abnormality content on the basis of the comparison result.

10. A computer-readable recording medium in which is recorded an abnormality detecting program for a storage element characterized by causing a computer to perform processing including:
a first step of requesting to make states of charge of a plurality of storage portions including at least one storage element equal upon notice of an occurrence of a variance of the states of charge of the plurality of storage portions;
a second step of requesting to measure an amount of change of voltages across terminals of the respective storage portions that have been allowed to stand since an end of an equalization process on the respective storage portions;
a third step of selecting, upon receipt of an input of an abnormality determination value calculated from the amount of change of the voltages across the terminals of the respective storage portions, one reference value from a plurality of reference values prepared in advance and comparing the abnormality determination value with the selected reference value; and
a fourth step of searching for an abnormality content correlated with the selected reference value and determining whether the respective storage portions are consistent with the searched abnormality content on the basis of the comparison result.

* * * * *